(12) United States Patent
Song et al.

(10) Patent No.: US 11,835,165 B2
(45) Date of Patent: Dec. 5, 2023

(54) MALE CONNECTOR HOLDER FOR AUTOMATIC CHEMICAL SUPPLY APPARATUS

(71) Applicant: STI CO., LTD., Anseong-si (KR)

(72) Inventors: Yong Ik Song, Seongnam-si (KR); Jun Woo Lee, Suwon-si (KR); Jin Woo Lee, Pyeongtaek-si (KR)

(73) Assignee: STI CO., LTD., Anseong-si (KR)

( * ) Notice: Subject to any disclaimer, the term of this patent is extended or adjusted under 35 U.S.C. 154(b) by 30 days.

(21) Appl. No.: 17/529,986

(22) Filed: Nov. 18, 2021

(65) Prior Publication Data

US 2022/0205559 A1 Jun. 30, 2022

(30) Foreign Application Priority Data

Dec. 28, 2020 (KR) .......................... 10-2020-0185233
Jul. 20, 2021 (KR) .......................... 10-2021-0094857

(51) Int. Cl.
*F16L 3/10* (2006.01)
*F16L 47/06* (2006.01)
*F16L 47/20* (2006.01)

(52) U.S. Cl.
CPC ............. *F16L 3/1075* (2013.01); *F16L 47/06* (2013.01); *F16L 47/20* (2013.01)

(58) Field of Classification Search
CPC ........ F16L 3/24; F16L 3/1075; F16L 2201/10; F16L 3/20; F16L 3/18; F16L 3/205; F16L 3/2053; F16L 3/16; F16L 47/06; F16L 3/21; F16K 47/20; B67D 7/0288
USPC ....................................................... 248/74.1
See application file for complete search history.

(56) References Cited

U.S. PATENT DOCUMENTS

| | | | | |
|---|---|---|---|---|
| 3,606,218 | A * | 9/1971 | Enlund | F16L 55/035 248/74.2 |
| 3,999,784 | A * | 12/1976 | Kennedy, Jr. | E02F 9/2275 248/65 |
| 5,280,964 | A * | 1/1994 | Walker | F16L 3/2235 285/353 |
| 6,924,432 | B1 * | 8/2005 | Connors | H02G 3/22 248/74.1 |
| 7,150,439 | B2 * | 12/2006 | Konold | F16L 3/1075 248/74.1 |
| 10,059,011 | B2 * | 8/2018 | Burlot | B25J 19/0025 |
| 2015/0328780 | A1 * | 11/2015 | Burlot | B25J 19/0025 74/490.02 |

(Continued)

FOREIGN PATENT DOCUMENTS

KR 10-1572537 11/2015
KR 10-1779493 9/2017

(Continued)

OTHER PUBLICATIONS

Machine translation of KR 10-2020-0129517.*

*Primary Examiner* — Christopher Garft
(74) *Attorney, Agent, or Firm* — KILE PARK REED & HOUTTEMAN PLLC

(57) ABSTRACT

The present disclosure relates to a male connector holder for an automatic chemical supply apparatus in which, before a chemical is supplied, a neck region of a male connector is pressed through a clamping holder and a support pad to perform alignment on the male connector so that the male connector may be accurately fastened to a female connector.

5 Claims, 11 Drawing Sheets

(56) References Cited

U.S. PATENT DOCUMENTS

2018/0023757 A1\* 1/2018 Baiera ..................... F16L 3/006
                                                        248/513
2021/0317946 A1\* 10/2021 Becher ................... F16M 11/04
2021/0407703 A1\* 12/2021 Rouleau ............... H01B 7/0045

FOREIGN PATENT DOCUMENTS

| KR | 10-1802900 | 11/2017 |
| KR | 10-1883372 | 8/2018 |
| KR | 10-2105505 | 4/2020 |
| KR | 10-2020-0129517 | 11/2020 |

\* cited by examiner (a)

(b)

(a)  (b)

(a)        (b)

(a)　　　　　　　(b)

MALE CONNECTOR HOLDER FOR AUTOMATIC CHEMICAL SUPPLY APPARATUS

CROSS-REFERENCE TO RELATED APPLICATION

This application claims priority to and the benefit of Korean Patent Application No. 10-2021-0094857 filed on Jul. 20, 2021 and Application No. 10-2020-0185233 filed on Dec. 28, 2020, the disclosures of which are incorporated herein by reference in its entirety.

BACKGROUND

1. Field of the Invention

The present disclosure relates to a male connector holder for an automatic chemical supply apparatus, and particularly, to a male connector holder for an automatic chemical supply apparatus that performs alignment on a male connector so as to accurately and precisely mount the male connector on a female connector.

2. Discussion of Related Art

In general, in all companies that use hazardous chemicals, such as companies that manufacture semiconductors, semiconductor devices, liquid crystal displays (LCDs), and organic light emitting diodes (OLEDs), pharmaceutical companies, and paint companies, various types of chemicals are used, and methods of safely supplying these chemicals are also diversified.

These chemicals are transferred from a chemical tank of a tank lorry stopped outside a building to a chemical storage tank installed inside the building and are then transferred from the chemical storage tank to a chamber in which a unit process is performed. Further, in contrast, chemicals may be transferred from a chemical storage tank to a tank lorry.

Currently, an automatic chemical supply apparatus called an automatic clean quick coupler (ACQC) unit has been released and is in use. Here, the chemical storage tank is generally provided inside the building, and the ACQC unit serves as a relay supplying between the chemical tank of the tank lorry located outside the building and the chemical storage tank located inside the building. In detail, the ACQC unit includes a chemical male connector holder and a chemical female connector, and may allow a transfer unit to move the chemical male connector holder to the chemical female connector so that a chemical male connector is automatically inserted into and fastened to the female connector. Accordingly, the chemicals may be supplied safely while a worker is not exposed to the chemicals.

FIG. 1 is a view for describing a side surface of a general ACQC unit. FIG. 1 illustrates Korean Patent Publication No. 10-1779493 (Automatic chemical supply apparatus). As illustrated, the automatic chemical supply apparatus 1000 (ACQC unit) may include a holder 100', a housing body 200, a transfer housing 300, a transfer unit 400, and a female connector 500.

One end of the transfer unit 400 may be inserted into an opening 601 formed in a wall body 600. The wall body 600 means a wall constituting a building, and the opening 601 is formed in a shape that is penetrated so that the outside and the inside of the building communicate with each other.

When the worker seats and fixes a male connector 20, to which a chemical hose 700 is connected, onto the holder 100', the holder 100' is moved forward by driving the transfer unit 400, and thus the male connector 20 is inserted into the female connector 500. The transfer unit 400 includes one or more stages and a driver, and thus the holder 100' may slide forward or rearward on the stages.

In general, a nitrogen hose 800 is also connected to the automatic chemical supply apparatus 1000 together with the chemical hose 700 and thus may accelerate the supply of the chemicals by pressurization by supplying nitrogen ($N_2$) to the tank lorry.

FIG. 2 shows views for describing cross sections of a male connector and peripheral components. As illustrated, the male connector 20 may be divided into a head region 20-1 of the male connector 20 inserted into the female connector 500 and a neck region 20-2 of the male connector 20 fastened by a buffer flange. A buffer flange 30 is fastened to a hose flange 40 by a plurality of bolts and nuts, and the chemicals are discharged to the outside of the male connector 20 through the chemical hose (not illustrated) connected to a hose flange 40 and a nozzle of the male connector 20.

However, due to a problem of the male connector 20 itself or a connection problem between the buffer flange 30 and the hose flange 40, a central axis A (solid line) of the male connector 20 and a central axis B (dotted line) of the hose flange 40 may not coincide with each other. Accordingly, the central axis A of the male connector 20 and a central axis of the female connector 500 do not coincide with each other, the male connector 20 cannot be accurately inserted into the female connector 500, and thus a smooth chemical supply may not be achieved. Thus, collision between the male connector 20 and the female connector 500 may cause damage, and accordingly, big accidents may occur. When there is a problem in fastening by a plurality of bolts/nuts, separation distances d and d' between the buffer flange 30 and the hose flange 40 will be different from each other ($d \neq d'$).

FIG. 3 shows views for describing a state in which a central axis of the male connector and a central axis of a house flange do not coincide with each other. FIG. 3(a) is a view of a state in which the male connector is lowered, and FIG. 3(b) is a view of a state in which the male connector is raised upward. As illustrated in FIG. 3(b), the male connector 20 is lowered (drooping), and the central axis A (solid line) of the male connector 20 is located below the central axis B (dotted line) of the hose flange 40, and thus an angle between the central axis A of the male connector 20 and the central axis B of the hose flange 40 is formed by as much as an angle θ.

Meanwhile, in order to prevent misinjection of the chemicals, a first key code block 31 may be provided below the buffer flange 30. The first key code block 31 may have a protruding shape and may also have a concave shape as illustrated. The first key code block 31 may be provided with a first key code (not illustrate).

Further, as illustrated in FIG. 3(b), the male connector 20 is raised upward, the central axis A (solid line) of the male connector 20 is located above the central axis B (dotted line) of the hose flange 40, and thus an angle between the central axis A of the male connector 20 and the central axis B of the hose flange 40 is formed by as much as an angle φ.

In this way, the reason why the central axis A of the male connector 20 and the central axis B of the hose flange 40 do not coincide with each other is that the male connector 20 is usually made of a Teflon material that is easily deformable. However, a part of the head region 20-1 of the male connector 20 is covered with a Steel Use Stainless (SUS) material and thus has relatively high strength, but the neck region 20-2 is made of a Teflon material, is exposed to the outside, and thus is frequently bent.

Further, since the neck region 20-2 is thinner than the head region 20-1, the shape of the neck region 20-2 may be deformed due to prolonged use and a load. Further, the shape of the male connector 20 itself may be deformed due to dropping or external impact, and when the buffer flange 30 is fastened to the hose flange 40, tightening between bolts/nuts is poor, an interval between the hose flange 40 and the buffer flange 30 is not horizontal, and thus these problems may occur. In addition, when the buffer flange 30 and the hose flange 40 are fastened, when one thereof is fastened with a force that is too strong, one Teflon surface is pressed, and thus the corresponding neck region 20-2 may be stretched and deformed. Thus, a separate structure is necessarily introduced to solve these problems.

SUMMARY OF THE INVENTION

The purpose of the present disclosure is to perform alignment on a male connector so that a central axis of the male connector and a central axis of a hose flange coincide with each other, and thus the male connector and a female connector are ultimately accurately fastened to each other.

One aspect of the present disclosure provides a male connector holder for an automatic chemical supply apparatus, in which, in order to supply a chemical from one to the other one of a chemical tank and a chemical storage tank connected to each other, a male connector is transferred in a front-rear direction by a transfer unit so as to connect the male connector to a female connector in a state in which the male connector coupled to a buffer flange is seated, the male connector holder including a support plate, a lower clamping holder fixed to the support plate, and a lower support pad having an upper end in contact with a neck region of the male connector so that alignment may be performed on the male connector.

The male connector holder for an automatic chemical supply apparatus further includes a support plate, a lower support pad that has an upper end in contact with the male connector, and a lower buffering member that connects the support plate and the lower support pad to buffer front collision so that alignment may be performed on the male connector.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which:

FIG. 3(a) is a view of a state in which the male connector is lowered, and FIG. 3(b) is a view of a state in which the male connector is raised upward;

FIG. 4(a) is a perspective view, and FIG. 4(b) is a view for describing a side surface vertically taken along line X-X';

FIG. 5(a) is a view for describing the male connector holder before the male connector is fastened, and FIG. 5(b) is a view for describing the male connector holder to which the male connector is fastened;

DETAILED DESCRIPTION OF EXEMPLARY EMBODIMENTS

Figure 1:
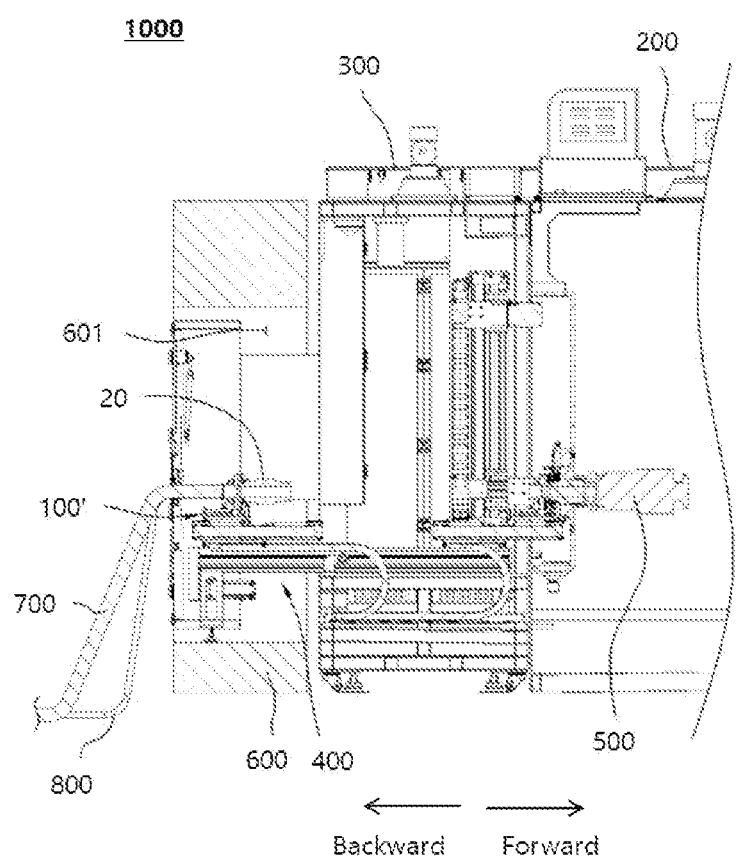
FIG. 1 is a view for describing a side surface of a general automatic clean quick coupler (ACQC) unit.

Hereinafter, the present disclosure will be described in detail so that those skilled in the art may easily understand and reproduce the present disclosure through exemplary embodiments described with reference to the accompanying drawings. In the description of the present disclosure, when it is determined that the detailed description of related widely known functions or configurations may make the subject of the embodiments of the present disclosure unclear, the detailed description will be omitted. Terms used throughout the present specification are terms defined in consideration of functions in the embodiments of the present disclosure, and since the terms may be sufficiently modified according to the intention, the custom, or the like of a user or operator, a definition of these terms should be made on the basis of the contents throughout the present specification.

Further, the above aspects and additional aspects of the disclosure will become apparent through the following embodiments. Although the aspects selectively described in the present specification or configuration of the embodiments selectively described in the present specification are illustrated as a single integrated component in the drawings, it is understood that, unless otherwise stated, the aspects and configurations may be combined with each other when it is not apparent to those skilled in the art that there is a technical contradiction.

Thus, since the embodiments described in the present specification and configurations illustrated in the drawings are merely the most exemplary embodiments of the present disclosure and do not represent all the technical spirit of the present disclosure, it should be understood that various equivalents and modifications that may replace the embodiments and the configurations are present at filling of the present application.

Figure 4:
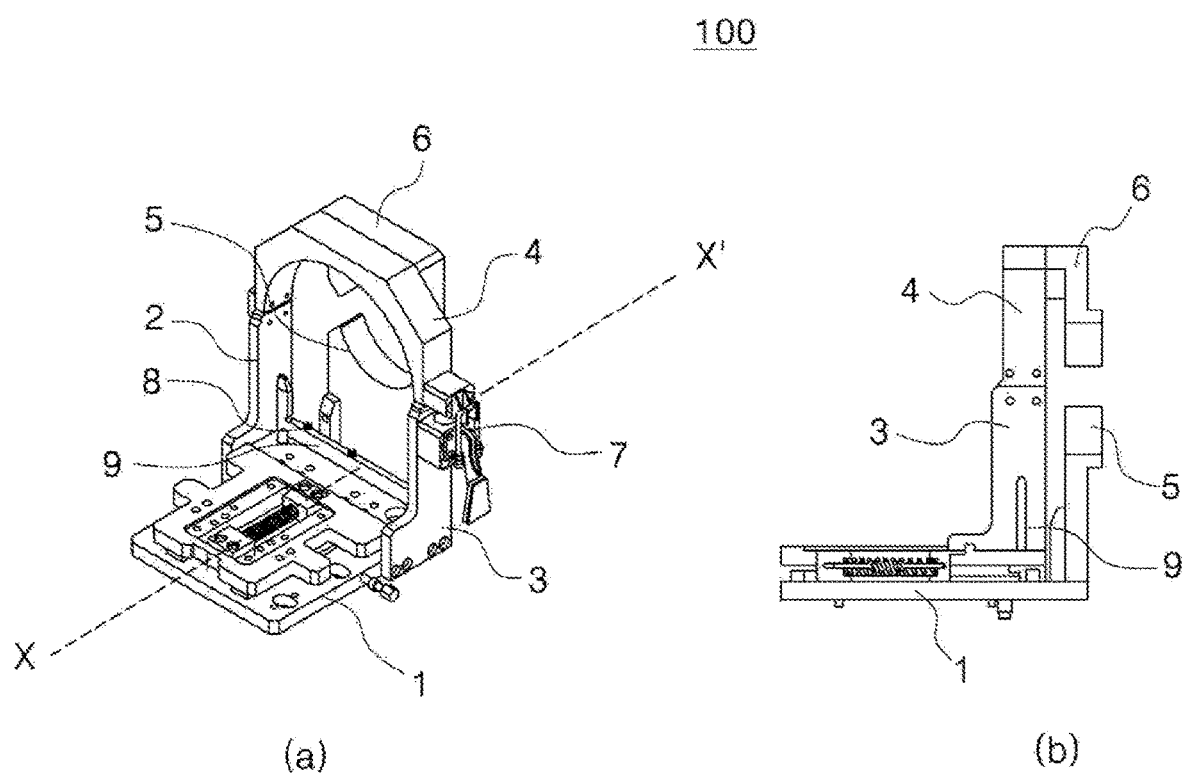
FIG. 4 shows views for describing a male connector holder for an automatic chemical supply apparatus according to one embodiment.

FIG. 4 shows views for describing a male connector holder for an automatic chemical supply apparatus according to one embodiment. FIG. 4(a) is a perspective view, and FIG. 4(b) is a view for describing a side surface vertically taken along line X-X'. As illustrated, a male connector holder 100 for an automatic chemical supply apparatus may include a support plate 1, lower clamping holders 2 and 3, an upper clamping holder 4, a lower support pad 5, an upper support pad 6, a detachable unit 7, and a second key code block 9.

The support plate 1 may be formed in a quadrangular plate shape.

The lower clamping holders 2 and 3 may be fixed to the support plate 1. The lower clamping holder may be divided into a first lower clamping holder 2 and a second lower clamping holder 3 having lower ends fixedly fastened to both side regions of the support plate 1. The lower ends of the first lower clamping holder 2 and the second lower clamping holder 3 may be fixedly fastened to both side regions of the support plate 1.

The upper clamping holder 4 may have one end hinge-coupled to the other end of the first lower clamping holder 2 and the other end detachably attached to the second lower clamping holder 3. The detachable unit 7 for detachable attachment may be provided. Accordingly, as the upper clamping holder 4 is opened or closed, a male connector 20 may be loaded or unloaded. The upper clamping holder 4 may have an arch-shaped structure to be disposed adjacent to an upper part of the male connector 20.

The lower support pad 5 may have a lower end fixedly fastened to a front end of the support plate 1 and an upper end at which a (lower) neck region 20-2 of the male connector 20 comes into contact therewith and is seated.

According to one embodiment, the male connector holder 100 may further include the upper support pad 6 that is provided above the lower support pad 5 and is fixedly fastened to the upper clamping holder 4 to come into contact with and press the neck region 20-2 of the male connector 20. The upper support pad 6 may be provided above the lower support pad 5 and fixedly fastened to the upper clamping holder 4 to come into contact with and press an (upper) neck region 20-2 of the male connector 20.

When the size of the male connector 20 is changed, a worker may continuously use the male connector holder 100 by replacing only the support pads 5 and 6. Further, when the support pads 5 and 6 are worn, the worker may easily replace the support pads 5 and 6.

The male connector holder 100 for an automatic chemical supply apparatus may further include the second key code block 9. The second key code block 9 has a unique shape to prevent different chemicals being erroneously injected, and second key codes 8 may be arranged at a unique interval on the second key code block 9 and coded through the interval. The second key code 8 may include a female key code or may include a male key code. As illustrated, two bolts may be arranged and coded in various methods such as arranging the bolts according to different intervals between the bolts, different lengths of the bolts, and different diameters of the bolts, and two or more bolts may be arranged.

Figure 3:
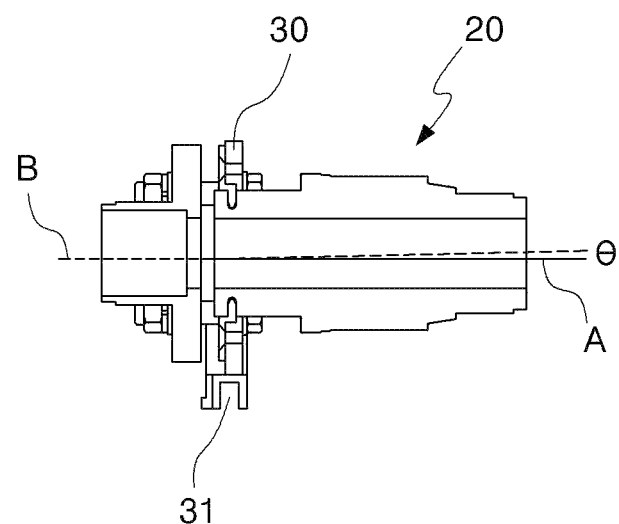
FIG. 3 shows views for describing a state in which a central axis of the male connector and a central axis of a house flange do not coincide with each other.
Figure 3:
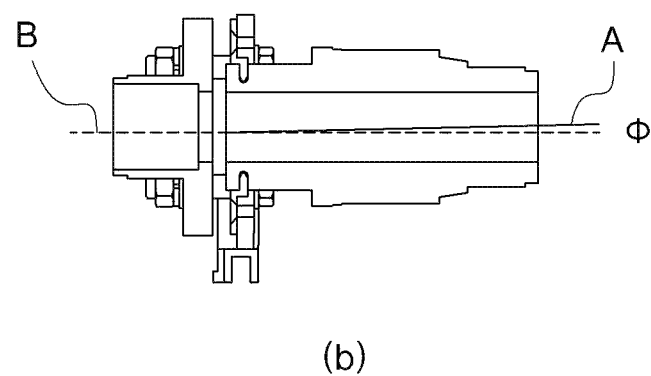

The second key code block 9 may have a concave shape or a protruding shape as illustrated and has a structure corresponding to a first key code block 31 provided below a buffer flange 30 of FIG. 3. Thus, when the male connector 20 is seated in the male connector holder 100, it may be identified whether or not a first key code and the second key code 8 coincide with each other.

Figure 5:
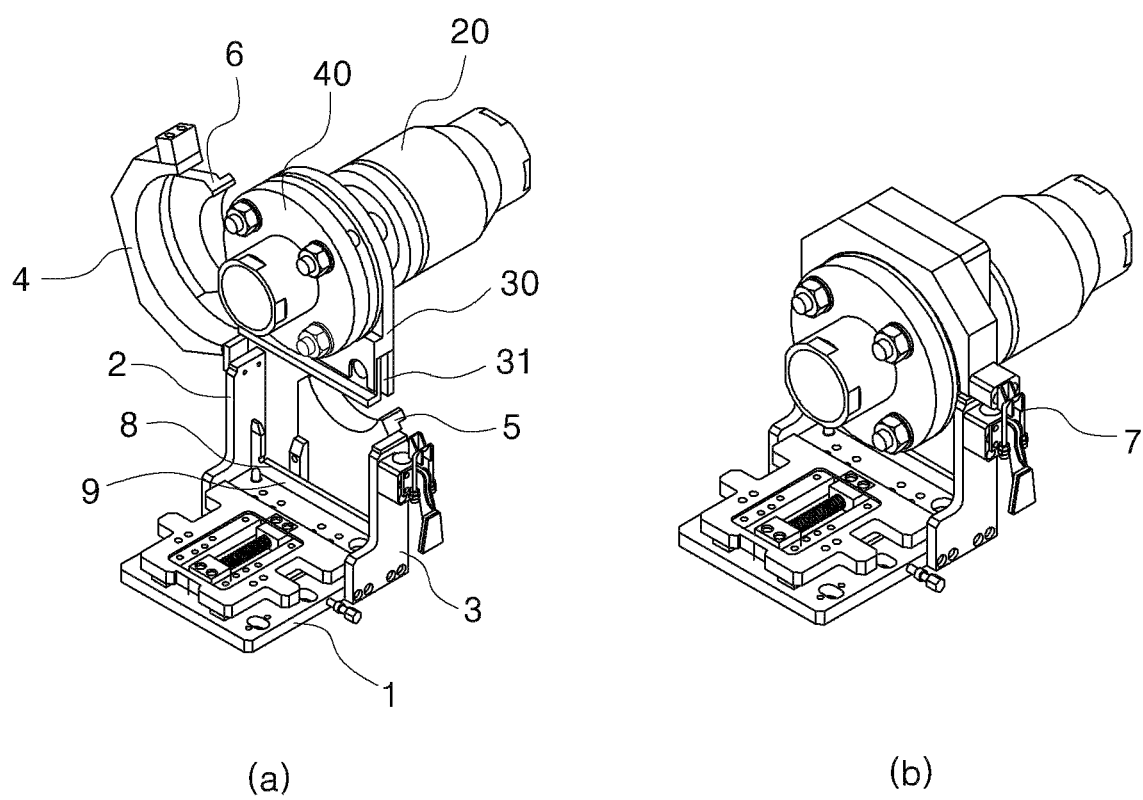
FIG. 5 shows views for describing the male connector holder for the automatic chemical supply apparatus to which the male connector is fastened.

FIG. 5 shows views for describing the male connector holder for the automatic chemical supply apparatus to which the male connector is fastened. FIG. 5(a) is a view for describing the male connector holder before the male connector is fastened, and FIG. 5(b) is a view for describing the male connector holder to which the male connector is fastened.

As illustrated in FIG. 5(a), the male connector 20 is coupled to the buffer flange 30, and the buffer flange 30 is fastened or coupled to the hose flange 40 through bolts/nuts. The hose flange 40 is connected to a hose (not illustrate). The upper clamping holder 4, of which one end is hinge-coupled to the other end of the first lower clamping holder 2, may be rotated. The male connector 20 may be inserted into a space between the lower support pad 5 and the upper support pad 6 by opening by rotation of the upper clamping holder 4 and may be fixed by locking the detachable unit 7 as illustrated in FIG. 5(b). The worker may correctly supply the chemical by identifying whether or not a first key code (not illustrated) having a structure corresponding to the second key code 8 is matched with the second key code 8. The second key code block 9 may have a shape corresponding to a location corresponding to the first key code block 31 of FIG. 3 and may have a concave shape or a protruding shape as illustrated.

Figure 6:
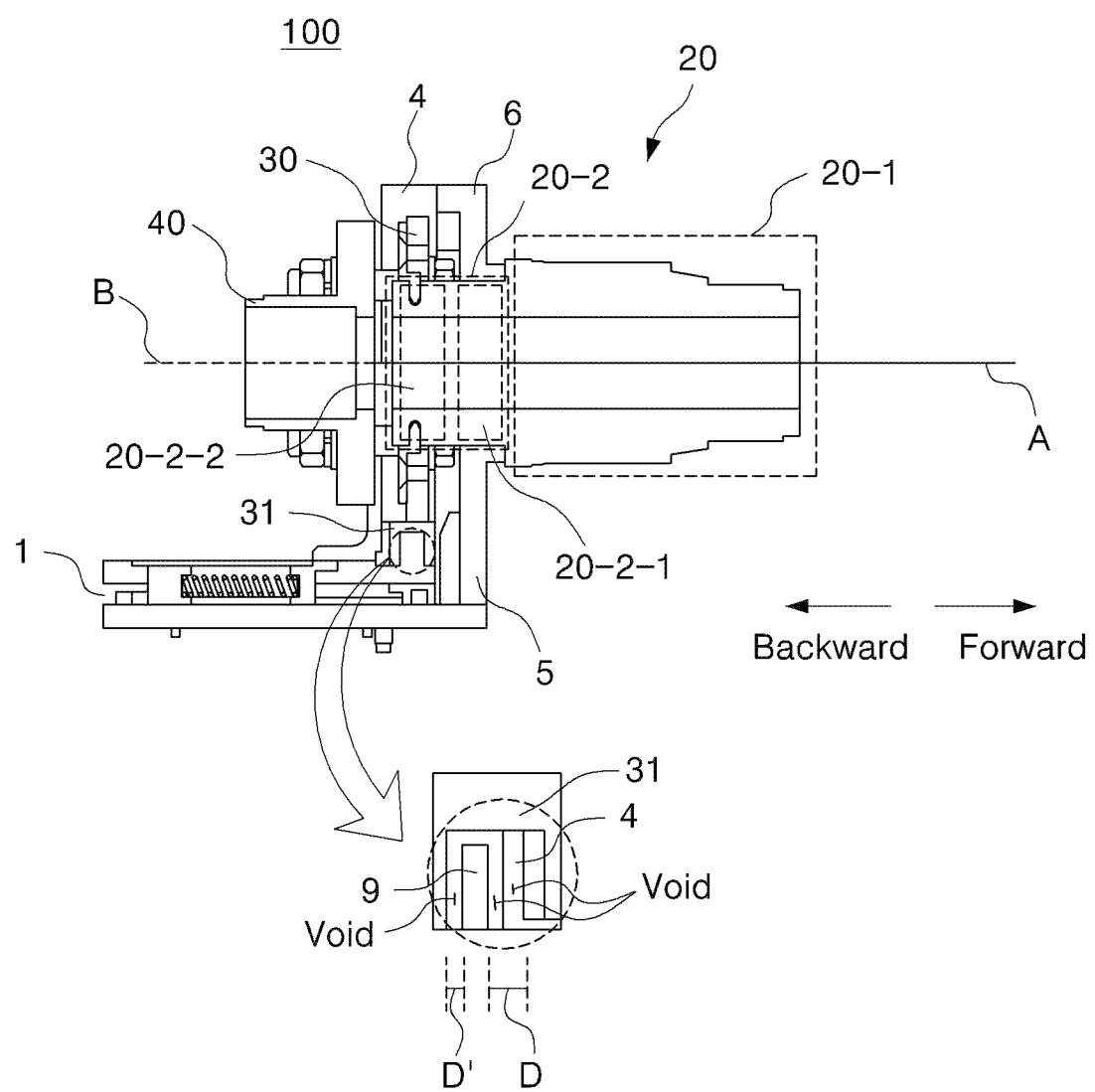
FIG. 6 is a view for describing a cutaway side surface of the male connector holder for the automatic chemical supply apparatus on which the male connector is loaded.

FIG. 6 is a view for describing a cutaway side surface of the male connector holder for the automatic chemical supply apparatus on which the male connector is loaded. As illustrated, the male connector 20 may be divided into a head region 20-1 of the male connector 20 that is located on a front side and has a large diameter and a neck region 20-2 of the male connector 20 that is located on a rear side and has a small diameter. The neck region 20-2 of the male connector 20 may be divided into a front neck region 20-2-1 of the male connector 20 and a rear neck region 20-2-2 of the male connector 20.

The lower support pad 5 and the upper support pad 6 may be in contact with the front neck region 20-2-1 of the male connector 20, and the buffer flange 30 is fastened to the rear neck region 20-2-2 of the male connector 20.

Due to this structure, the lower support pad 5 and the upper support pad 6 vertically press the front neck region 20-2-1 of the male connector 20, and thus a central axis A (solid line) of the male connector 20 coincides with a central axis B (dotted line) of the hose flange 40.

The first key code block 31 and the second key code block 9 of FIG. 6 may be engaged and fastened with each other. Complete fastening means that both the first key code block 31 and the second key code block 9 are matched with each other so that the first key code and the second key code 8 are engaged with each other.

According to one embodiment, the second key code block 9 may have a structure in which, when the second key code block 9 is fastened to the first key code block 31, a void is formed between the front side and the rear side of the first key code block 31 and the second key code block 9. Since a structure in which the void is formed between the first key code block 31 and the second key code block 9 is provided, rotational movement of the buffer flange 30 may be allowed. As illustrated, a separation distance (gap) corresponding to distances D and D' may be formed between the first key code block 31 and the second key code block 9 to form the void. The distance D relates to a front empty space, and the distance D' relates to a rear empty space. The values of the distances D and D' may be freely set by those skilled in the art.

In order to form a structure in which the void is formed between the first key code block 31 and the second key code block 9, the second key code block 9 may be structured to be sufficiently thin.

Due to this structure, while the lower support pad 5 and the upper support pad 6 vertically press the front neck region 20-2-1 of the male connector so that the central axis A (solid line) of the male connector 20 coincides with the central axis B (dotted line) of the hose flange 40, the buffer flange 30 may be rotated and moved, and thus, alignment may be more easily performed on the male connector 20.

Figure 7:
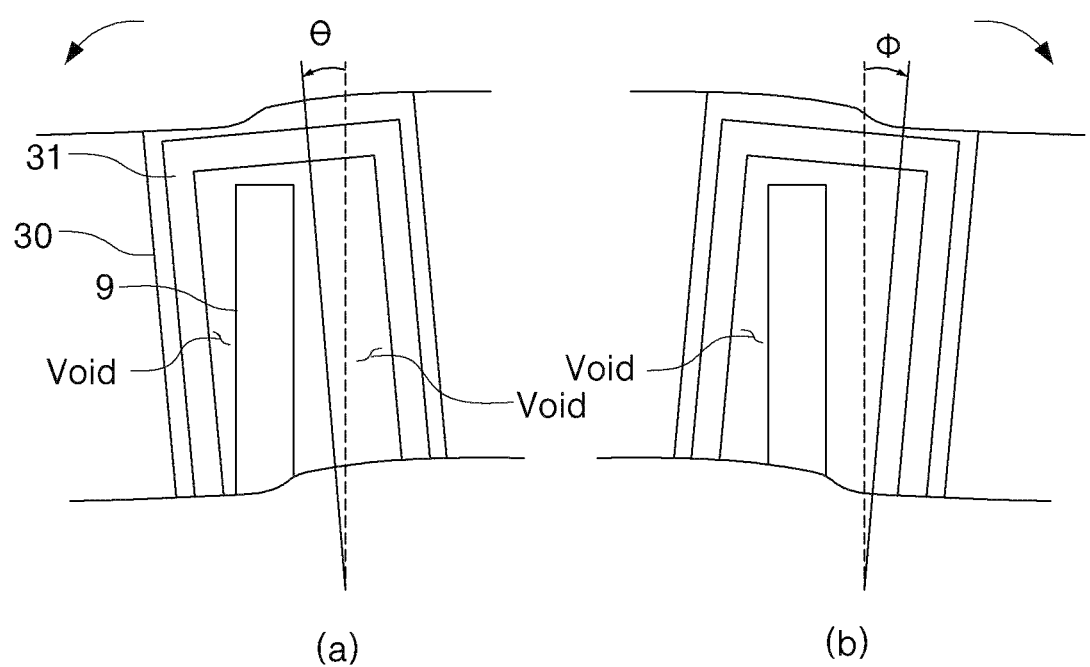
FIG. 7 shows views for describing an operation in which a buffer flange is rotated during an alignment process of the male connector.

FIG. 7 shows views for describing an operation in which a buffer flange is rotated during an alignment process of the male connector.

Since the void is provided between the first key code block 31 and the second key code block 9 as shown FIG. 6, the buffer flange 30 may be rotated in a counterclockwise direction by an angle of θ as illustrated in FIG. 7(a), and the buffer flange 30 may be rotated in a clockwise direction by an angle of ϕ as illustrated in FIG. 7(b). Accordingly, as illustrated in FIG. 3(a), when the male connector 20 is lowered downward by the angle of θ, alignment is performed such that the front neck region 20-2-1 of the male connector 20 is lifted upward from the bottom to the top and the buffer flange 30 is rotated and moved in a counterclockwise direction by the angle of θ. Further, as illustrated in FIG. 3(b), when the male connector 20 is raised upward by the angle of ϕ, alignment is performed such that the front neck region 20-2-1 of the male connector 20 is pressed and lowered from the top to the bottom and the buffer flange 30 is rotated and moved in a clockwise direction by the angle of ϕ.

Due to such a structure, the rotational movement of the buffer flange 30 is allowed, and thus alignment may be more easily performed on the male connector 20.

Figure 8:
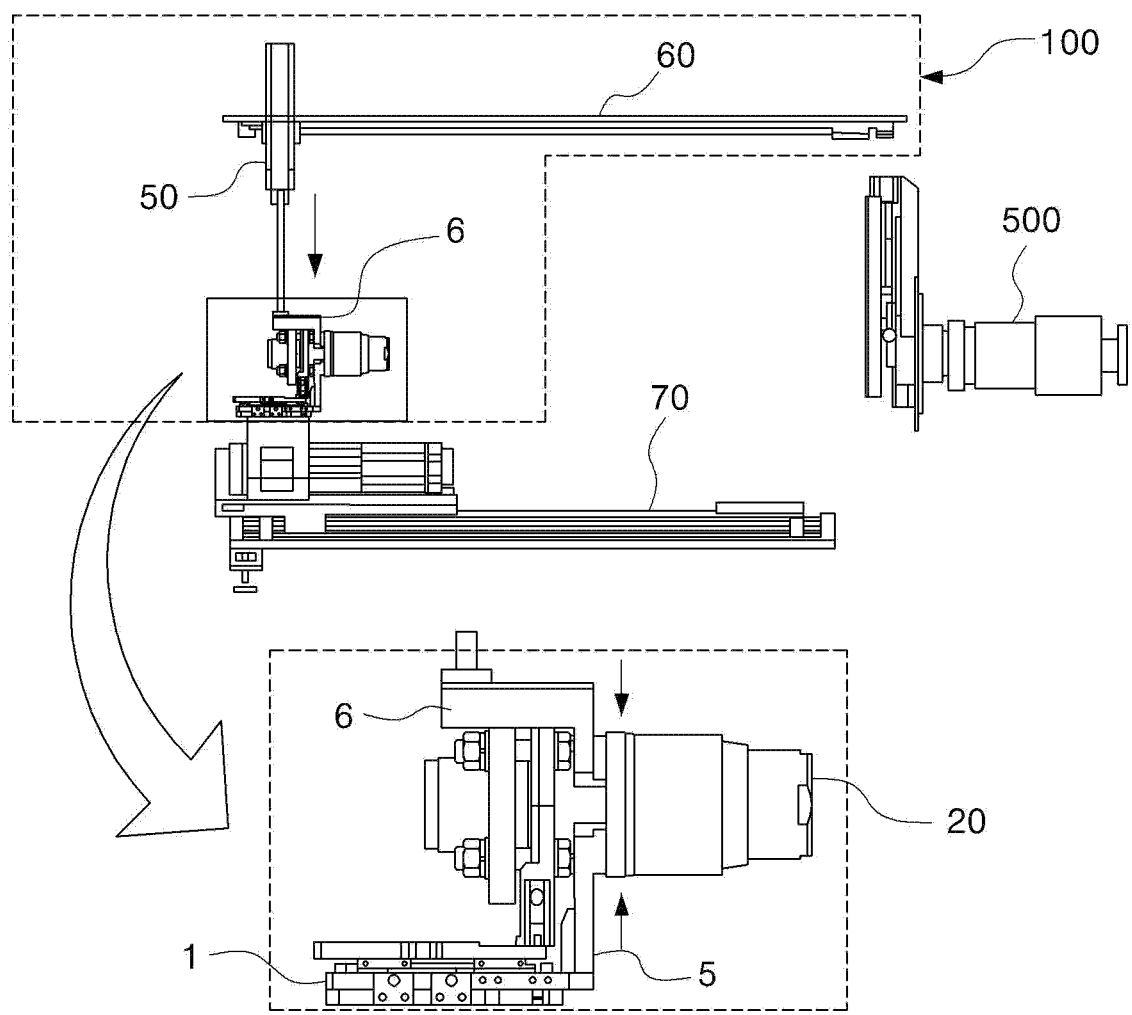
FIG. 8 is a view for describing a male connector holder that automatically comes into contact and is pressed according to another embodiment.

FIG. 8 is a view for describing a male connector holder that automatically comes into contact and is pressed according to another embodiment. As illustrated, the male connector holder 100 for an automatic chemical supply apparatus, in which, in order to supply a chemical from one to the other one of a chemical tank and a chemical storage tank connected to each other, the male connector 20 is transferred in a front-rear direction by the transfer unit 400 so as to connect the male connector to a female connector in a state in which the male connector 20 coupled to the buffer flange 30 is seated, may include the support plate 1, the lower support pad 5, a clamping drive unit 50, the upper support pad 6, and an upper stage 60. Thus, in the present disclosure, the male connector holder 100 may be defined as extending to the clamping drive unit 50 and the upper stage 60. The support plate 1, the lower support pad 5, the clamping drive unit 50, and the upper support pad 6 may be classified for the chemical male connector and a nitrogen male connector and may exist in a pair or in a dual form.

The lower support pad 5 may be fixed to the support plate 1 and may be in contact with the neck region 20-2 of the male connector 20 at an upper end thereof. It is sufficient that the contact between the lower support pad 5 and the neck region 20-2 is made before the male connector 20 and the female connector 500 are completely fastened.

The clamping drive unit 50 may be provided above the lower support pad 5 and may be provided as a cylinder or a motor. The clamping drive unit 50 may include a connection part such as a shaft and may be connected to the upper support pad 6 through the connection part.

The upper support pad 6 may be provided above the lower support pad 5 and may be fixedly fastened to the clamping drive unit 50 to come into contact with and press the neck region 20-2 of the male connector 20 by driving the clamping drive unit 50. The upper support pad 6 may have a lower end in contact with the neck region 20-2 of the male connector 20. The pressing may be performed in a vertical direction (arrow direction).

The upper support pad 6 and the lower support pad 5 have a semi-circular shaped or arc shaped contact surface therebetween, and when the upper support pad 6 and the lower support pad 5 vertically come into contact and are pressed, left and right parts of the male connector 20 are naturally pressed along the semi-circular shaped or arc shaped contact surface, and thus the left and right parts may be aligned as well.

Figure 2:
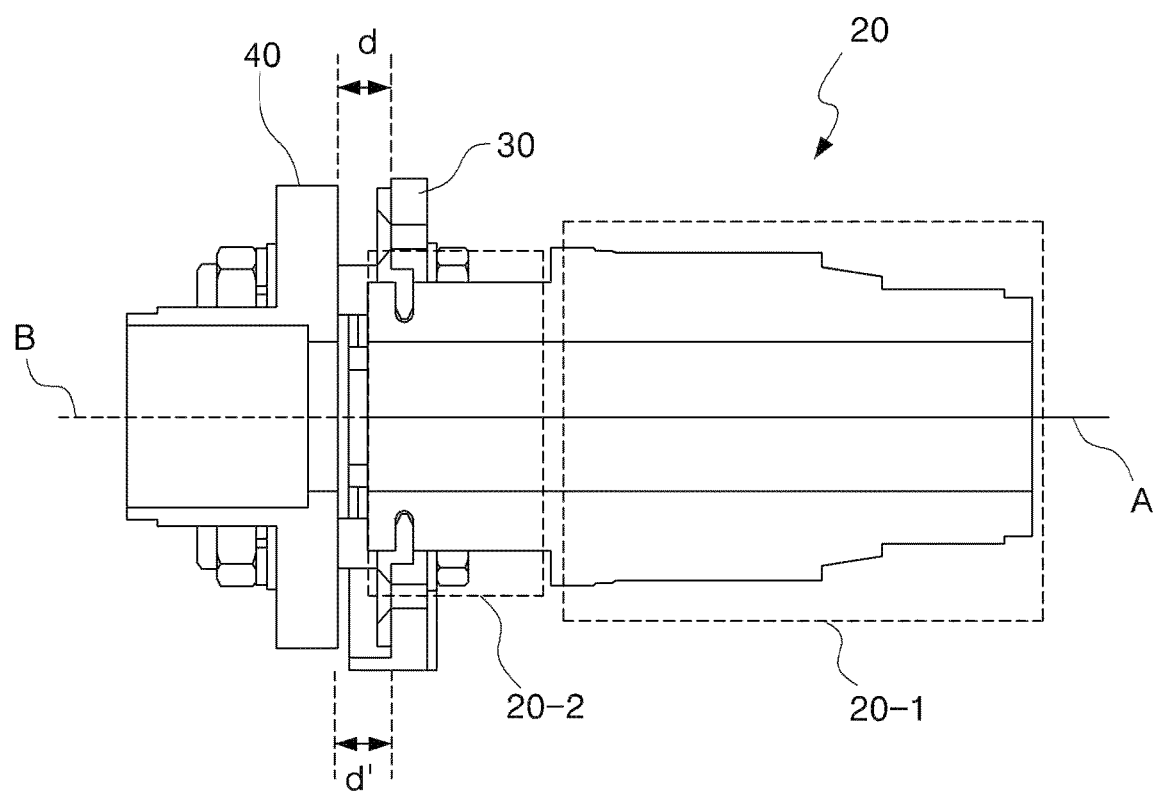
FIG. 2 shows views for describing cross sections of a male connector and peripheral components.

It is sufficient that the upper support pad 6 and the lower support pad 5 are made to be in contact with or press the neck region 20-2 only before the male connector 20 and the female connector 500 are completely fastened. In other words, the neck region may come into contact or be pressed immediately before the male connector 20 and the female connector 500 are fastened. The division of the neck region 20-2 and the head region 20-1 of the male connector 20 is illustrated in FIG. 2. Since the neck region 20-2 has a smaller diameter than that of the head region 20-1, a step is formed at a boundary therebetween.

Alignment may be performed on the male connector 20 due to the neck region 20-2 vertically coming into contact with and pressing the lower support pad 5 and the upper support pad 6. It is efficient to press the lower support pad 5 and the upper support pad 6 while being vertically located on the same line.

According to one embodiment, the male connector holder 100 may further include the upper stage 60. The upper stage 60 may support and guide the clamping drive unit 50 so that the clamping drive unit 50 may be transported in the front-rear direction. The upper stage 60 may be fixedly disposed in an upper frame of the automatic chemical supply apparatus and may be fastened to the clamping drive unit 50.

Figure 9:
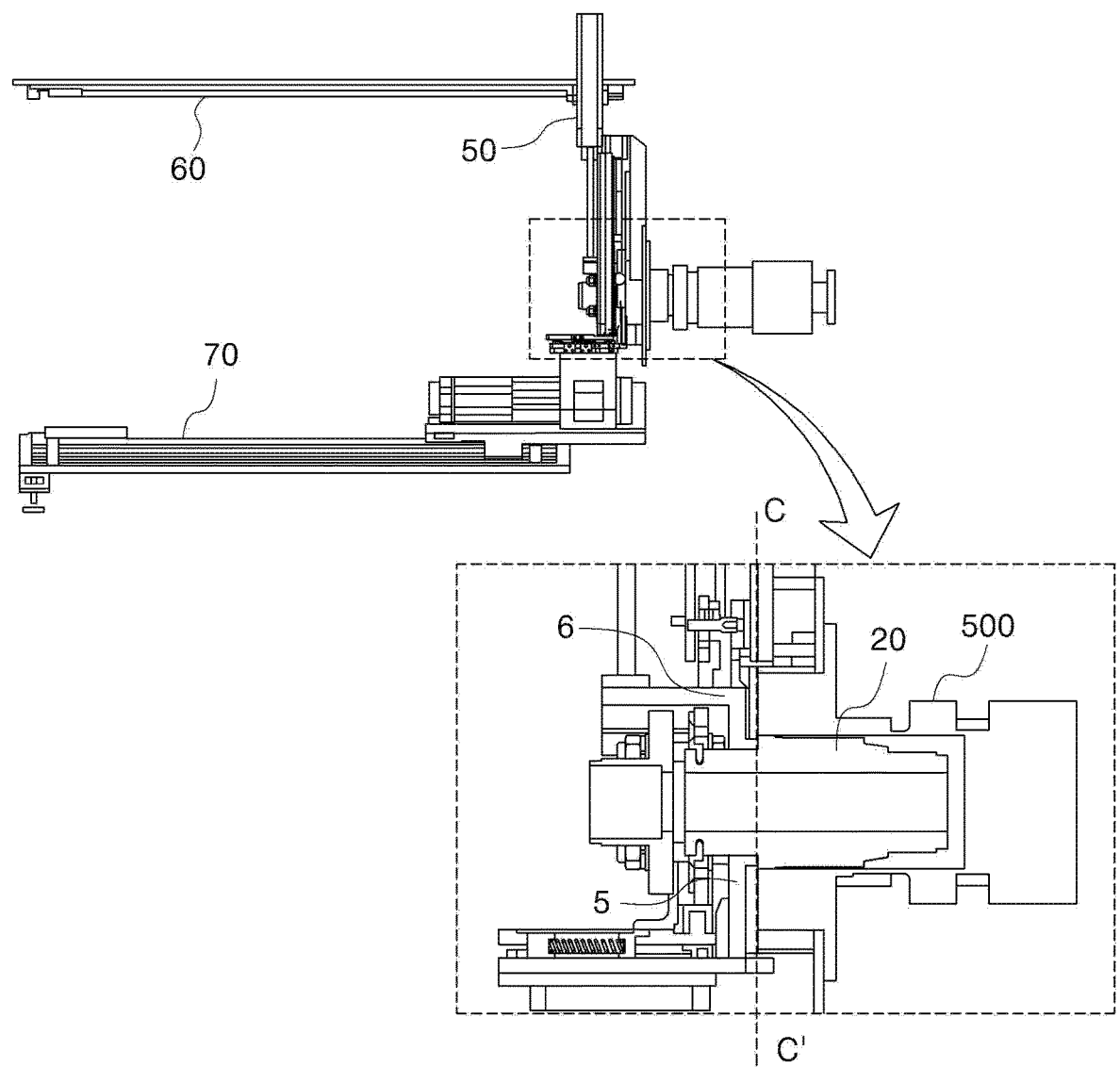
FIG. 9 is a view for describing a structure in which the male connector and the female connector are fastened to each other according to the embodiment of FIG. 8.

FIG. 9 is a view for describing a structure in which the male connector and the female connector are fastened to each other according to the embodiment of FIG. 8. As illustrated, the male connector 20 may move forward along the upper stage 60 and the lower stage 70 to be inserted into and fastened to the female connector 500.

When the fastening is completed, an inlet surface of the female connector 500 and an end surface of the male connector 20 may be located on the same vertical line C-C'. Since the upper support pad 6 and the lower support pad 5 press the neck region 20-2 of the male connector 20, the deformation of the neck region 20-2 is supplemented, and thus correct coupling (fastening) may be achieved.

Figure 10:
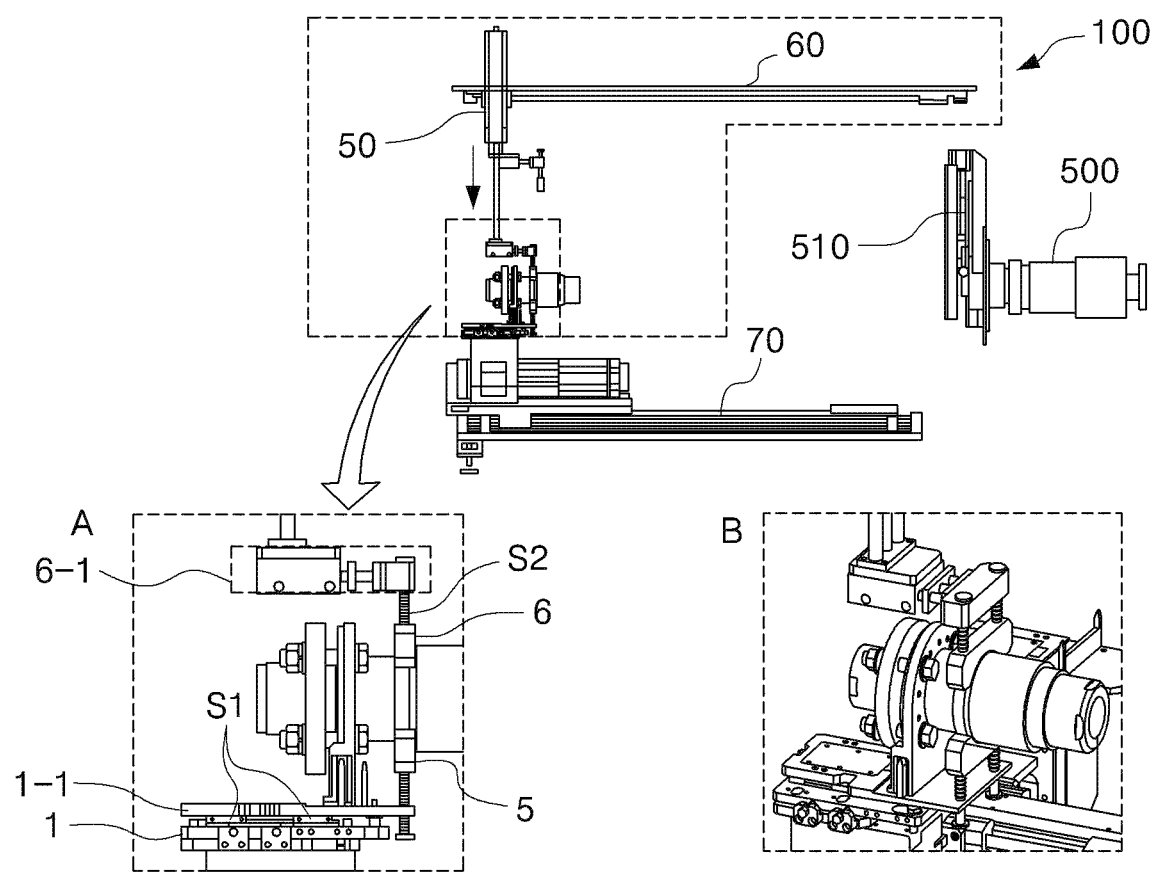
FIG. 10 is a view for describing a male connector holder that automatically comes into contact and is pressed according to still another embodiment.

FIG. 10 is a view for describing a male connector holder that automatically comes into contact and is pressed according to still another embodiment. As illustrated, the male connector holder 100 for an automatic chemical supply apparatus, in which, in order to supply a chemical from one to the other one of a chemical tank and a chemical storage tank connected to each other, the male connector 20 is transferred in a front-rear direction by the transfer unit 400 so as to connect the male connector to a female connector in a state in which the male connector 20 coupled to the buffer flange 30 is seated, may include the support plate 1, the lower support pad 5, a lower buffer member 1-1, the clamping drive unit 50, the upper support pad 6, an upper buffer member 6-1, and the upper stage 60. FIG. 10(a) is an enlarged side view a, and FIG. 10(b) is a perspective view of A.

The support plate 1, the lower support pad 5, the lower buffer member 1-1, the clamping drive unit 50, the upper support pad 6, and the upper buffer member 6-1 may be classified into the chemical male connector and the nitrogen male connector and may be present in a pair or in a dual form.

The upper end of the lower support pad 5 may be in contact with the male connector 20.

The upper support pad 6 may be provided above the lower support pad 5 and may be fixedly fastened to the clamping drive unit 50 to come into contact with and press the male connector 20 by driving the clamping drive unit 50.

The lower buffer member 1-1 may connect the support plate 1 and the lower support pad 5 to buffer front collision of the lower support pad 5. The collision refers to a broad-sense physical touch including not only a strong impact but also a soft touch.

For example, when the lower support pad 5 or the lower buffer member 1-1 move forward along the upper stage 60 or the lower stage 70 to collide with or come into contact with a frame 510 around an inlet of the female connector 500 or on a side of the female connector 500, the lower support pad 5 or the lower buffer member 1-1 may be buffered to have an elastic restoring force so that the lower support pad 5 is slowly moved rearward. The lower buffer member 1-1 may include a spring S1. As illustrated, the spring S1 may be disposed on the support plate 1 to extend in the front-rear direction and may be disposed at a front end of the support plate 1 to be directly coupled to the lower support pad 5.

The clamping drive unit 50 may be provided above the lower support pad 5 and may be provided as a cylinder or a motor. The clamping drive unit 50 may include a connection part such as a shaft and may be connected to the upper support pad 6 through the connection part.

The clamping drive unit 50 and the upper stage 60 may each be driven by a drive unit configured as a cylinder or motor separate from each other or may also be driven together because the drive unit is configured in only one of the clamping drive unit 50 and the upper stage 60, and the drive unit, the clamping drive unit 50, and the upper stage 60 are mechanically connected to each other.

The upper support pad 6 may be provided above the lower support pad 5 and may come into contact with and press the male connector 20 by driving the clamping drive unit 50. The upper support pad 6 may include a spring S2 and may be connected to the upper buffer member 6-1 by the spring S2. Thus, the upper support pad 6 may separately and elastically press the male connector 20 due to the spring S2 extending vertically.

The pressing may be performed in a vertical direction (arrow direction).

The upper buffer member 6-1 may connect the clamping drive unit 50 and the upper support pad 6 to buffer the front collision.

For example, when the upper support pad 6 or the upper buffer member 6-1 collide with the frame 510 around the inlet of the female connector 500 or on the side of the female connector 500 while moving forward along the upper stage 60 or the lower stage 70, the upper support pad 6 may be moved slowly rearward by the buffering action. As illustrated, the upper buffer member 6-1 may be configured as a cylinder or may include a spring disposed to extend in the front-rear direction that is like the lower buffer member 1-1.

The lower support pad 5 or the upper support pad 6 may first come into contact with and press the head region 20-1 of the male connector 20, may then be located in the neck region 20-2 of the male connector 20 while the male connector 20 and the female connector 500 are fastened to each other, and may come into contact with and press the neck region 20-2 of the male connector 20.

Figure 11:
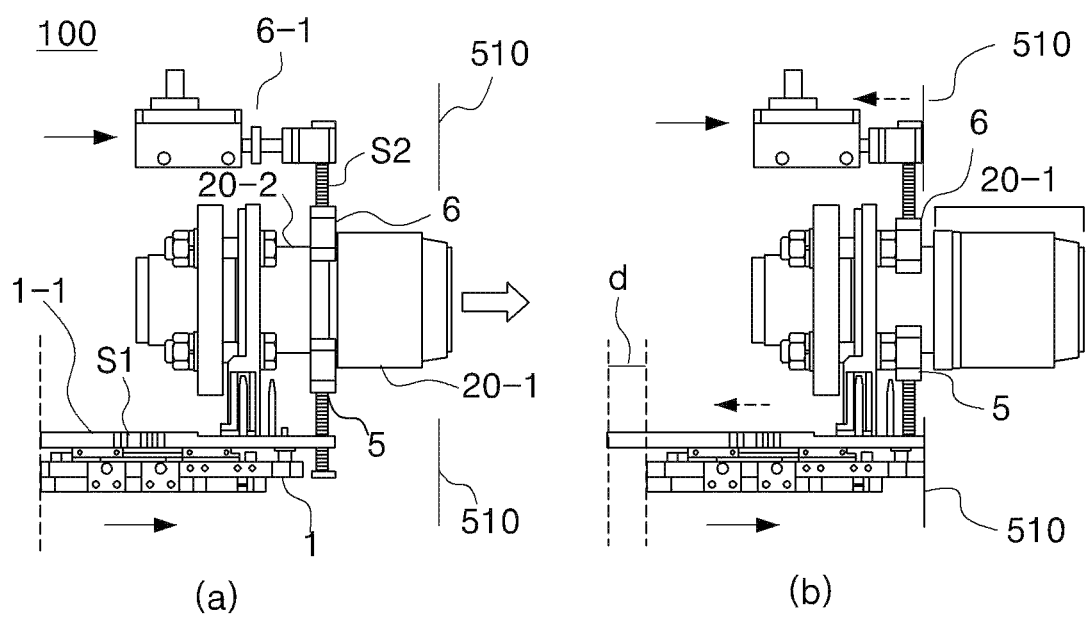
FIG. 11 shows views for describing changes of a contact location and a pressing location between a lower support pad and an upper support pad according to the embodiment of FIG. 10.

FIG. 11 shows views for describing changes of a contact location and a pressing location between a lower support pad and an upper support pad according to the embodiment of FIG. 10. As illustrated in FIGS. 11(*a*) and 11(*b*), in the male connector holder 100 for an automatic chemical supply apparatus, the upper end of the lower support pad 5 may come into contact with the head region 20-1 of the male connector 20 (see FIG. 11(*a*)), and thereafter, the lower support pad 5 may be located in the neck region 20-2 of the male connector 20 by buffering the lower buffer member 1-1 and may come into contact with the neck region 20-2 of the male connector 20 (see FIG. 11(*b*)).

The collision may be caused by a reaction when the lower buffer member 1-1 comes into contact with the frame 510 on the side of the female connector 500 as illustrated and may be caused by a touch between the lower support pad 5 and the vicinity of the inlet of the female connector 500 according to still another embodiment. A step difference between the lower buffer member 1-1 and the support plate 1 may be generated by as much as a distance d by compression or tension of the spring S1 due to the reaction. The lower buffer member 101 may include the spring S or may include only the spring S. The collision refers to a broad-sense physical touch including not only a strong impact but also a soft touch.

According to an additional embodiment, in the male connector holder 100 for an automatic chemical supply apparatus, the upper support pad 6 may be in contact with the head region 20-1 of the male connector 20 (see FIG. 11(*a*)) and, thereafter, may be located in the neck region 20-2 of the male connector 20 due to the buffering of the upper buffer member 6-1 to come into contact with and press the neck region 20-2 of the male connector 20 (see FIG. 11(*b*)).

The upper support pad 6 is connected to the upper buffer member 6-1 through the spring S2, and thus even when the upper support pad 6 is located from the head region 20-1 to the neck region 20-2 of the male connector 20, a downward pressing force may still be maintained. Accordingly, both the front buffering and the alignment of the neck region 20-2 of the male connector 20 may be achieved. The spring S2 is an optional component which may or may not be provided.

The lower support pad 5 and the upper support pad 6 may press the neck region 20-2 of the male connector 20 while being vertically located on the same line.

According to the present disclosure, alignment can be performed on a male connector so that a central axis of the male connector and a central axis of a hose flange coincide with each other, and accordingly, the male connector and a female connector can be ultimately accurately fastened, and thus a chemical can be smoothly supplied. Further, malfunction of an automatic chemical supply apparatus can be prevented, and safety of workers can be achieved.

Further, front buffering of the male connector holder and alignment of a neck region of the male connector are achieved together so that malfunction of the automatic chemical supply apparatus can be prevented and the male connector can be aligned.

What is claimed is:

1. A male connector holder for an automatic chemical supply apparatus, in which, in order to supply a chemical from one to the other one of a chemical tank and a chemical storage tank connected to each other, a male connector is transferred in a front-rear direction by a transfer unit so as to connect the male connector to a female connector in a state in which the male connector coupled to a buffer flange is seated, the male connector holder comprising:

a support plate;

a lower support pad that is fixed to the support plate and has an upper end in contact with a neck region of the male connector;
a clamping drive unit provided above the lower support pad and provided as a cylinder or a motor; and
an upper support pad that is provided above the lower support pad, is fixedly fastened to the clamping drive unit, and comes into contact with and presses the neck region of the male connector by driving the clamping drive unit,
wherein the male connector holder comprises an upper stage that supports and guides the clamping drive unit so that the clamping drive unit is transferred in a front-rear direction.

2. A male connector holder for an automatic chemical supply apparatus, in which, in order to supply a chemical from one to the other one of a chemical tank and a chemical storage tank connected to each other, a male connector is transferred in a front-rear direction by a transfer unit so as to connect the male connector to a female connector in a state in which the male connector coupled to a buffer flange is seated, the male connector holder comprising:
a support plate;
a lower support pad having an upper end in contact with the male connector; and
a lower buffer member that connects the support plate and the lower support pad to buffer front collision,
wherein
the male connector holder comprises:
an upper support pad that is provided above the lower support pad, is fixedly fastened to a clamping drive unit, and comes into contact with and presses the male connector by driving the clamping drive unit;
an upper buffer member that connects the clamping drive unit and the upper support pad to buffer the front collision; and
the clamping drive unit provided above the lower support pad, and
the upper support pad is connected to the upper buffer member through a spring.

3. The male connector holder of claim 2, wherein the lower support pad has an upper end that comes into contact with a head region of the male connector, is then located in a neck region of the male connector by buffering the lower buffer member, and comes into contact with the neck region of the male connector.

4. The male connector holder of claim 2, wherein the upper support pad comes into contact with a head region of the male connector, is then located in a neck region of the male connector by buffering the upper buffer member, and comes into contact with and presses the neck region of the male connector.

5. The male connector holder of claim 2, further comprising an upper stage that supports and guides the clamping drive unit so that the clamping drive unit is transferred in the front-rear direction.

\* \* \* \* \*